(12) United States Patent
Chuang

(10) Patent No.: US 10,794,504 B2
(45) Date of Patent: Oct. 6, 2020

(54) HIGH PRESSURE CARTRIDGE INFLATOR

(71) Applicant: Louis Chuang, Taichung (TW)

(72) Inventor: Louis Chuang, Taichung (TW)

(*) Notice: Subject to any disclaimer, the term of this patent is extended or adjusted under 35 U.S.C. 154(b) by 194 days.

(21) Appl. No.: 15/937,993

(22) Filed: Mar. 28, 2018

(65) Prior Publication Data
US 2019/0032802 A1    Jan. 31, 2019

(30) Foreign Application Priority Data

Jul. 28, 2017  (TW) .............................. 106125530 A

(51) Int. Cl.
*F16K 15/20* (2006.01)
*G01L 19/16* (2006.01)
*B60S 5/04* (2006.01)
*F17C 13/04* (2006.01)

(52) U.S. Cl.
CPC .............. *F16K 15/207* (2013.01); *B60S 5/04* (2013.01); *F17C 13/04* (2013.01); *G01L 19/16* (2013.01)

(58) Field of Classification Search
CPC ........ F16K 15/207; F16K 15/205; B60S 5/04; F17C 13/04; F17C 2250/0626; F17C 2270/0727; F17C 13/002; F17C 13/025; F17C 2205/0302; Y10T 137/36
USPC ...................................................... 137/224
See application file for complete search history.

(56) References Cited

U.S. PATENT DOCUMENTS

| 1,175,208 A * | 3/1916 | Vosler .................... B60S 5/043 137/224 |
| 1,371,089 A * | 3/1921 | Herring .................. B60S 5/043 137/224 |
| 1,428,502 A * | 9/1922 | Hansen ............... B60C 23/0496 285/356 |
| 2,533,685 A * | 12/1950 | Nurkiewicz ........... A62C 13/74 169/74 |
| 3,807,432 A * | 4/1974 | Cain ..................... F16K 15/207 137/224 |
| 5,544,670 A * | 8/1996 | Phillips .................... B60S 5/04 137/224 |
| 8,893,741 B2 * | 11/2014 | Weng ...................... F04B 53/10 137/224 |
| 9,488,540 B2 | 11/2016 | Chu |
| 2008/0196772 A1 | 8/2008 | Shin |

FOREIGN PATENT DOCUMENTS

TW    201602538 A    1/2016

* cited by examiner

*Primary Examiner* — Michael R Reid
(74) *Attorney, Agent, or Firm* — Alan D. Kamrath; Karin L. Williams; Mayer & Williams PC

(57) ABSTRACT

A high pressure cartridge inflator has a body including an air inlet port connectible to a high pressure cartridge, an air outlet port connectible to a valve of an object to be inflated, an air discharge port, and defining a first channel extending from the air let port to the air outlet port and a second channel extending from the first channel to the air discharge port. A pressure indicator is disposed within the body and is fluidly connected to the first and second channels. A safety device is disposed in the second channel and is configured to selectively prevent and allow high pressure air in the high pressure cartridge to flow out of the body through the air discharge port.

13 Claims, 6 Drawing Sheets

HIGH PRESSURE CARTRIDGE INFLATOR

BACKGROUND OF THE INVENTION

1. Field of the Invention

The present invention relates to a high pressure cartridge inflator and, particularly, that the inflator is connectible to a high pressure cartridge and has a pressure indicator and a safety device protecting the pressure indicator from being damaged by high pressure air flowing from the high pressure cartridge.

2. Description of the Related Art

A high pressure cartridge inflator configured for inflating a tire has a first end connectible to a high pressure cartridge and a second end connectible to a valve of the tire respectively. Furthermore, the high pressure cartridge inflator has a channel that extends from the first end to the second end and opens to the high pressure cartridge the tire and the valve of the tire for high pressure air in the high pressure cartridge to travel to the tire.

Further, a high pressure cartridge inflator that is adapted to provide a measure of tire pressure has a pressure indicator. Such high pressure cartridge inflator is convenient for use, but a user has to heed if the tire valve is in an open position in the operation of the high pressure cartridge inflator, otherwise the pressure indicator can be damaged by a large influx of high pressure air.

The present invention is, therefore, intended to obviate or at least alleviate the problems encountered in the prior art.

SUMMARY OF THE INVENTION

According to the present invention, a high pressure cartridge inflator has a body including an air inlet port connectible to a high pressure cartridge, an air outlet port connectible to a valve of an object to be inflated, an air discharge port, and defining a first channel extending from the air let port to the air outlet port and a second channel extending from the first channel to the air discharge port. A pressure indicator is disposed within the body and is fluidly connected to the first and second channels. A safety device is disposed in the second channel and is configured to selectively prevent and allow high pressure air in the high pressure cartridge to flow out of the body through the air discharge port. The safety device includes a resilient member and a seal that is urged by the resilient member and that is adapted to move to a first position preventing the high pressure air from flowing out of the body and a second position allowing the high pressure air to flow out of the body. The seal is in the first position when the high pressure air flows into the valve of the object to be inflated. Furthermore, the seal is in the second position when the high pressure air does not flow into the valve of the object to be inflated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an objective of the present invention to provide a high pressure cartridge inflator that is connectible to a high pressure cartridge and that includes a pressure indicator and a safety device protecting the pressure indicator from being damaged by high pressure air flowing from the high pressure cartridge.

Other objectives, advantages, and new features of the present invention will become apparent from the following detailed description of the invention when considered in conjunction with the accompanied drawings.

DETAILED DESCRIPTION OF THE INVENTION

Figure 1:
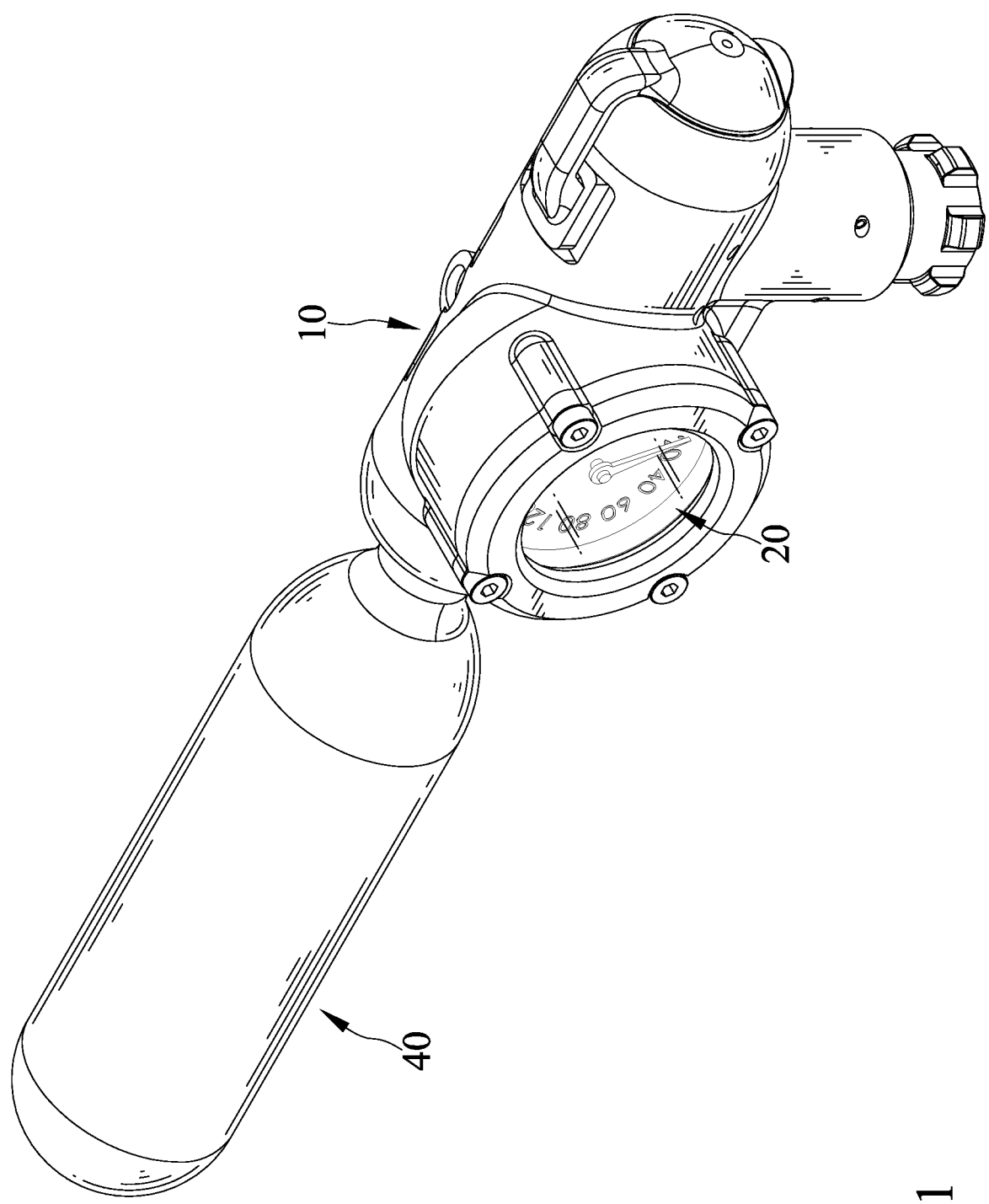
FIG. 1 is a perspective view showing a high pressure cartridge inflator in accordance with the present invention and a high pressure cartridge connected to the high pressure cartridge inflator.
Figure 2:
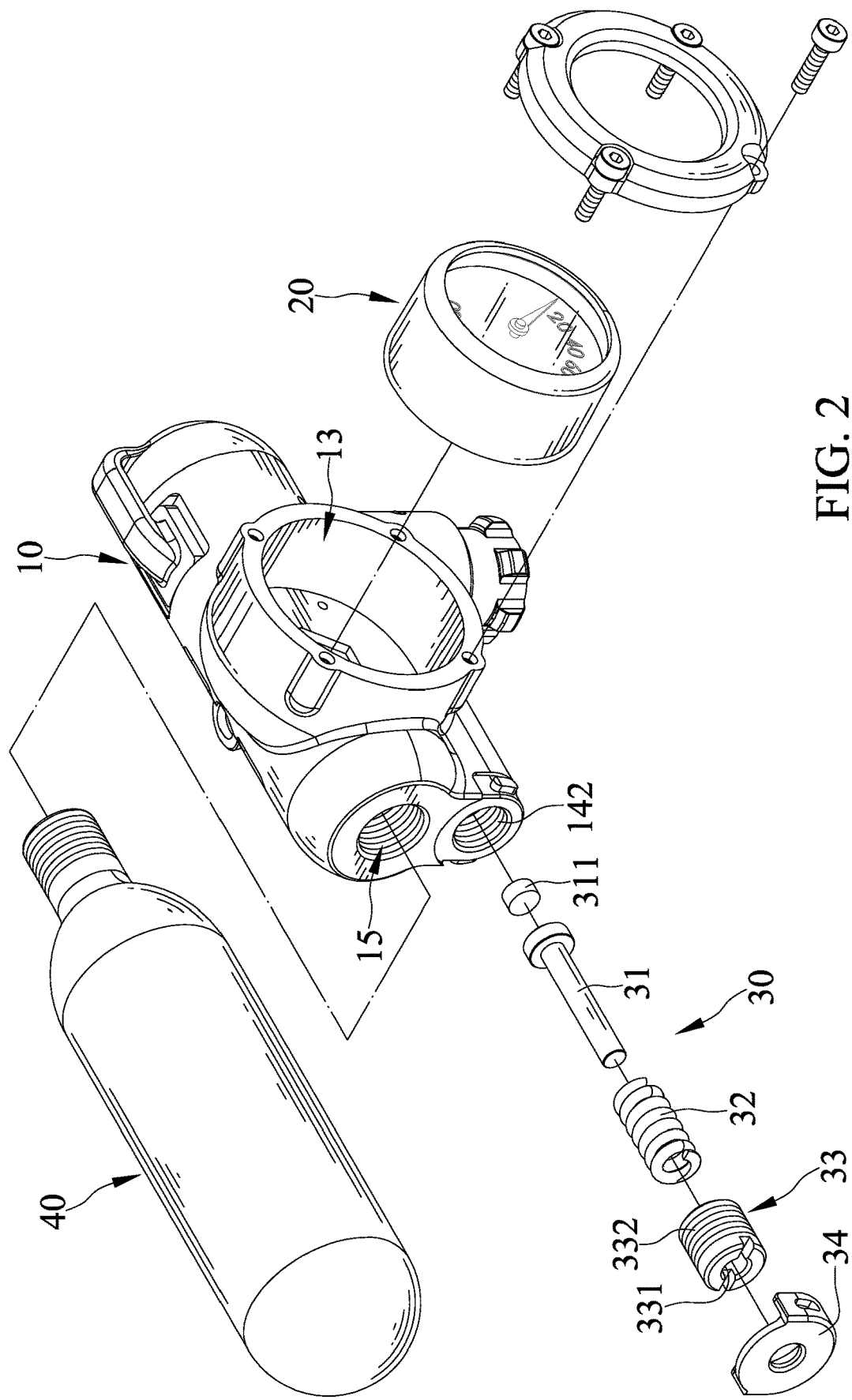
FIG. 2 is an exploded perspective view of FIG. 1.
Figure 3:
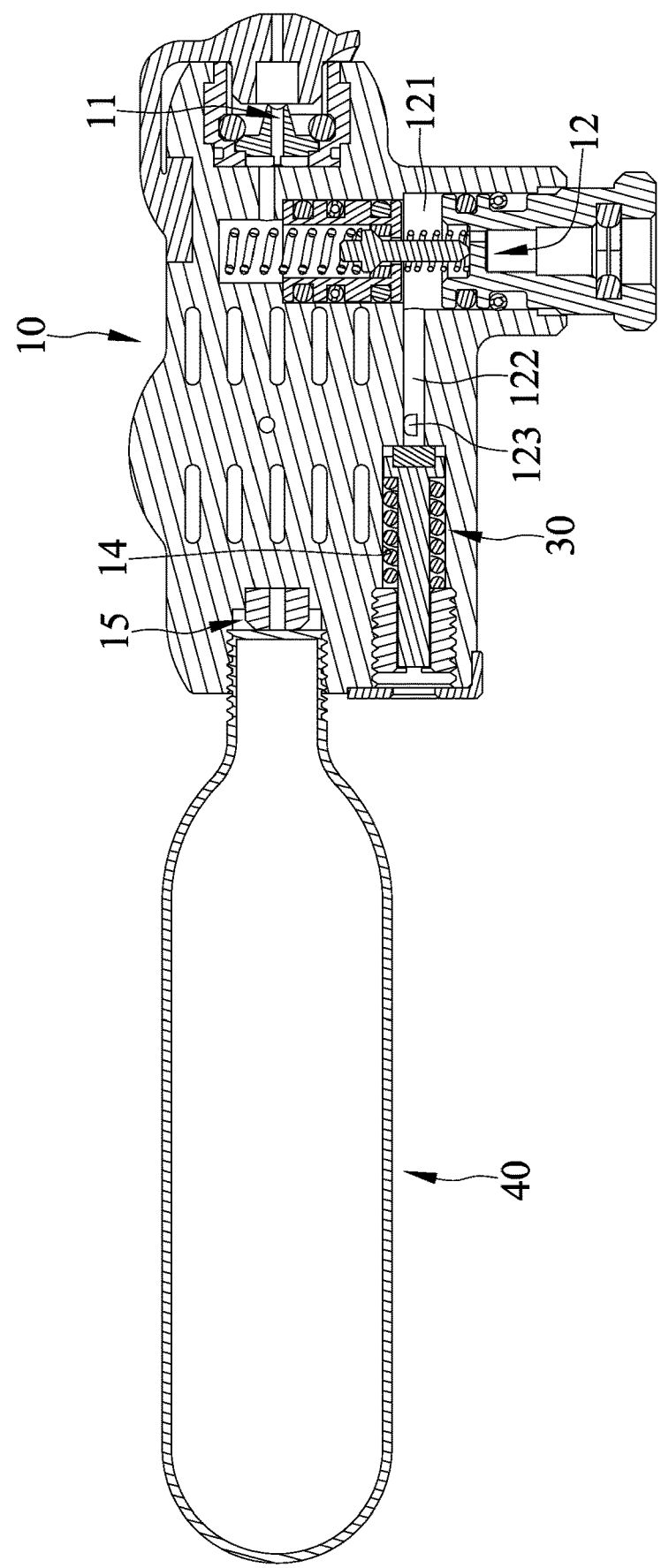
FIG. 3 is a cross-sectional view of FIG. 1.
Figure 4:
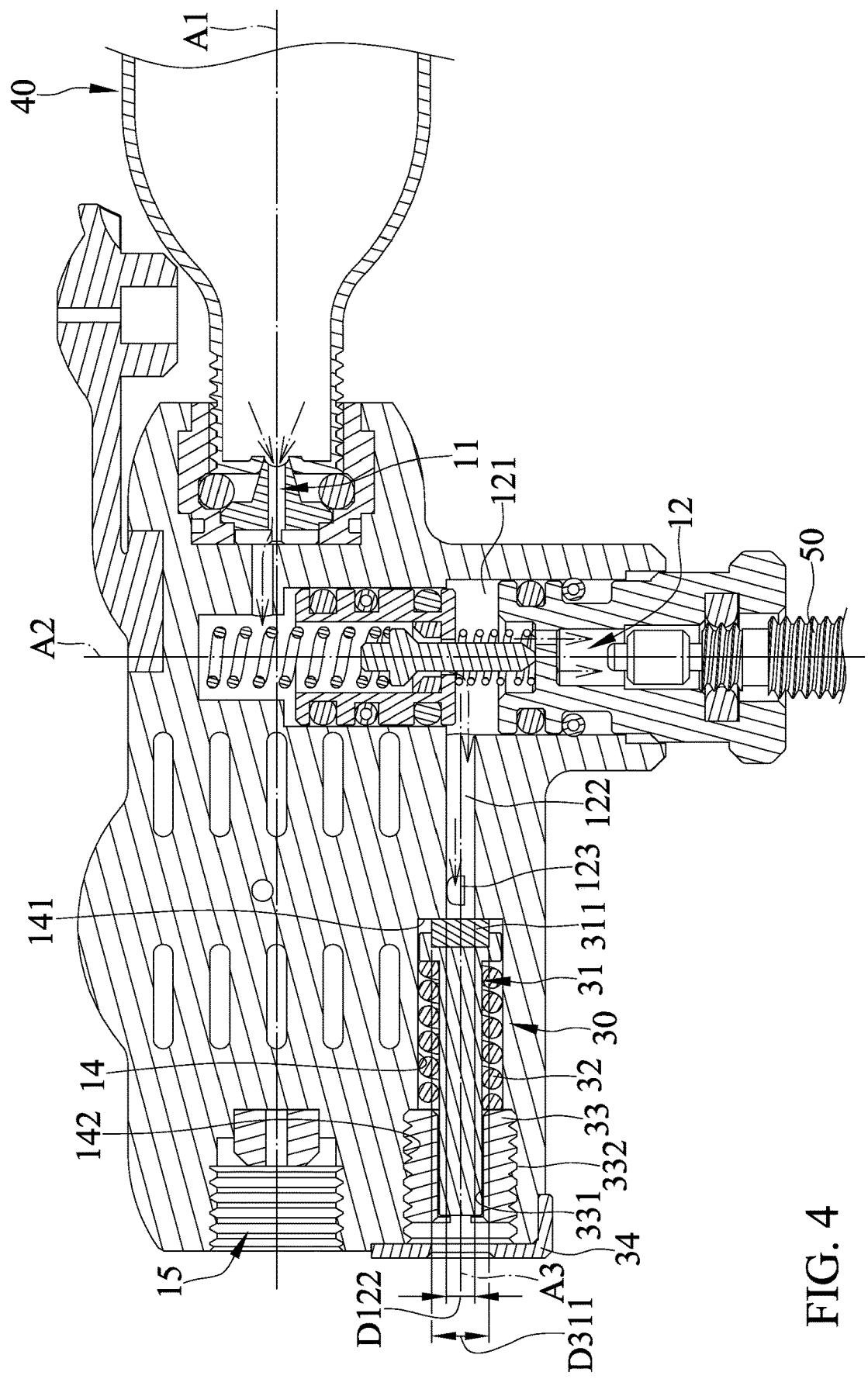
FIG. 4 is a cross-sectional view showing that the high pressure cartridge inflator of the present invention is in operation and allows high pressure air in the high pressure cartridge to flow into a valve and that the valve is in an open position.
Figure 5:
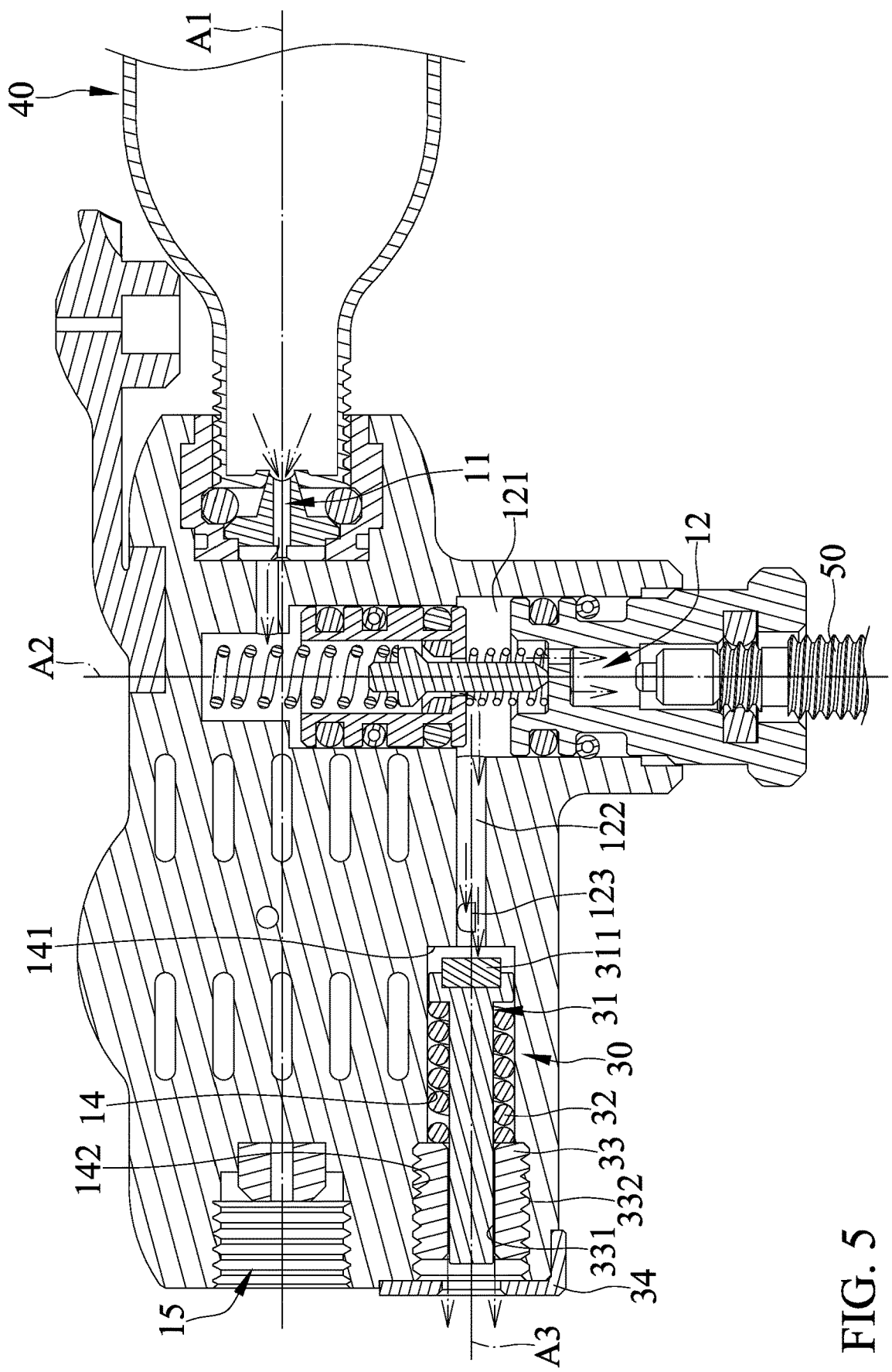
FIG. 5 is a cross-sectional view which differs from FIG. 4 in that the valve is in a closed position and a safety device of the high pressure cartridge inflator is in a position allowing high pressure air in the high pressure cartridge to flow out of the high pressure cartridge inflator, thereby protecting a pressure indicator from be damaged by a large influx of high pressure air.
Figure 6:
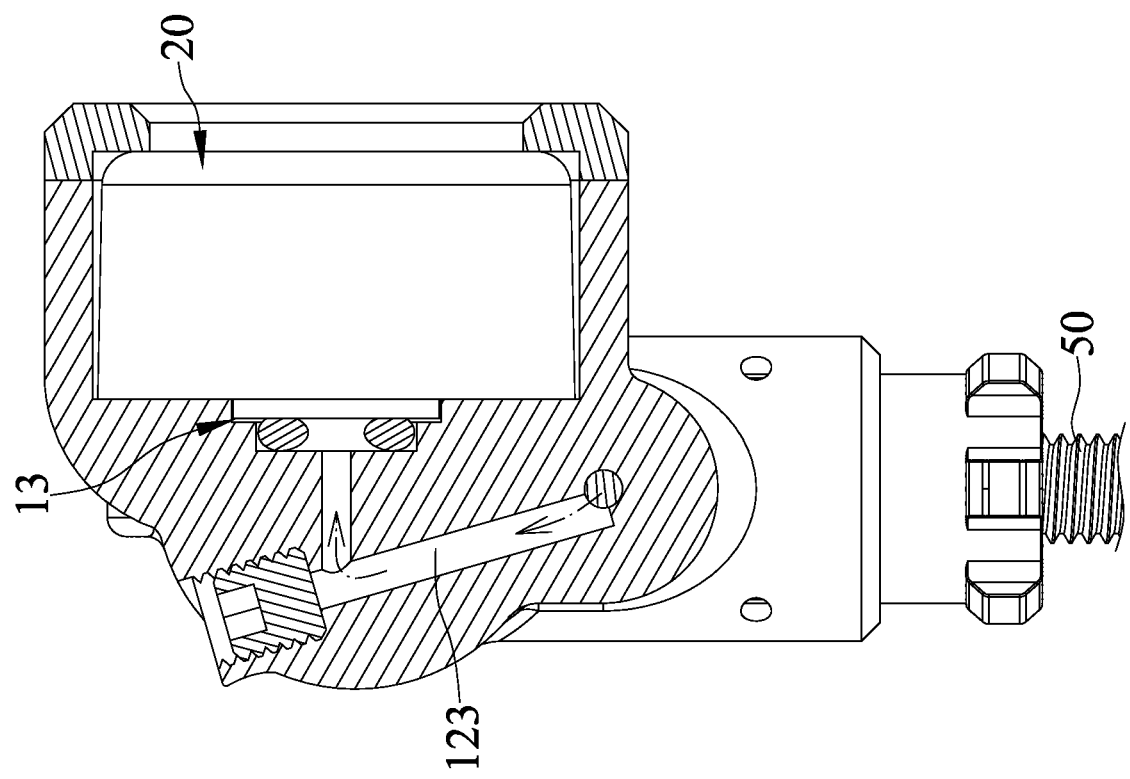
FIG. 6 is an extended cross-sectional view of FIG. 5 which shows that the high pressure air is fluidly connected to the pressure indicator.

A high pressure cartridge inflator in accordance with the present invention has a body 10 which includes an air inlet port 11 connectible to a high pressure cartridge 40, an air outlet port 12 connectible to a valve 50 of an object to be inflated, a compartment 13, and an air discharge port 14. The body 10 defines a first channel 121 extending from the air inlet port 11 to the air outlet port 12, a second channel 122 extending from the first channel 121 to the air discharge port 14, and a third channel 123. The air inlet port 11, the first channel 121, and the second channel 122 extend in different axial directions. The air inlet port 11 extends along a first axis A1. The first channel 121 extends along a second axis A2. The first axis A1 is not parallel to the second axis A2. The second channel 122 extends along a third axis A3. The third axis A3 is parallel to the first axis A1. In addition, the second channel 122 has first and second sections of different cross sectional size. The first cross section has a first diameter D122. The second cross section has a second diameter D311 greater than the first diameter D122. Thus, the second channel 122 defines a shoulder 141 that transitions from the first section to the second section. The second channel 122 includes a first distal end of the first section connected to the first channel 121. The second channel 122 includes a first end distal end of the second section connected to a second distal end of the first section and a second distal end of the second section connected to the air discharge port 14 respectively. The body 10 includes a cover 34 attached thereto and configured to selectively close and open an opening of the air discharge port 14. The body 10 has a connecting portion 15 to which another high pressure cartridge 40 is connected. The connecting portion 15 forms a cavity to which an end of another pressure cartridge 40 is connected. The connecting portion 15 is not fluidly connected to the first and second channels 121 and 122.

A pressure indicator 20 is disposed within the body 10 and is fluidly connected to the first and second channels 121 and 122. The pressure indicator 20 is received in the compartment 13. The third channel 123 fluidly connects the pressure indicator 20 to the first and second channels 121 and 122. Therefore, the high pressure air can flow in the first, second, and third channels 121, 122, and 123.

A safety device 30 is disposed in the second channel 122. The safety device 30 is disposed in the second section of the second channel 122. The safety device 30 is configured to selectively prevent and allow high pressure air in the high pressure cartridge 40 to flow out of the body 10 through the air discharge port 14. The safety device 30 includes a resilient member 32 and a seal 31 that is urged by the resilient member 32 and that is adapted to move to a first position preventing the high pressure air from flowing out of the body 10 and a second position allowing the high pressure air to flow out of the body 10. The seal 31 is in the first position when the high pressure air flows into the valve 50 of the object to be inflated. The seal 31 is in the second position when the high pressure air does not flow into the valve 50 of the object to be inflated. The seal 31 forms a block portion 311 configured to selectively close and open an opening defined by the second distal end of the first section of the second channel 122. The seal 31 in the first position is rest on the shoulder 141 and closes the opening defined by the second distal end of the first section of the second channel 122. The seal 31 in the second position is spaced apart from the shoulder and opens the opening. The resilient member 32 is a coil spring.

The safety device 30 also includes an adjuster 33 adjustably secured to the second section of the second channel 122 and preventing the seal 31 and the resilient member 32 from moving out of the second section of the second channel 122. The second section of the second channel 122 has first threads 142 formed thereon and the adjuster 33 has second threads 332 formed thereon in thread engagement with the first threads 142. The adjuster 33 cooperates with the seal 31 to retain the resilient member 32. The seal 31 and the adjuster 33 each form a retaining wall and the resilient member 32 is retained between the retaining walls of the seal 31 and the adjuster 33. The adjuster 33 has a hole 331 extending therethrough and the seal 31 has a segment inserted and movably retained in the hole 331. The seal 31 moves in an axial direction when changing between the first and second positions. A periphery of the hole 331 and the segment of the seal 31 have a gap existing therebetween. The gap and the hole 331 are configured to allow the high pressure air to flow pass the adjuster 33.

In view of the foregoing, the safety device 30 protects the pressure indicator 20 from being damaged by high pressure air flowing from the high pressure cartridge 40.

The foregoing is merely illustrative of the principles of this invention, and various modifications can be made by those skilled in the art without departing from the scope and spirit of the invention.

What is claimed is:

1. A high pressure cartridge inflator comprising:
a body including an air inlet port connectible to a high pressure cartridge, an air outlet port connectible to a valve of an object to be inflated, an air discharge port, and defining a first channel extending from the air inlet port to the air outlet port and a second channel extending from the first channel to the air discharge port, wherein the second channel has first and second sections;
a pressure indicator disposed within the body and fluidly connected to the first and second channels; and
a safety device disposed in the second channel and configured to selectively prevent and allow high pressure air in the high pressure cartridge to flow out of the body through the air discharge port, wherein the safety device includes a resilient member and a seal that is urged by the resilient member and that is adapted to move to a first position preventing the high pressure air from flowing out of the body and a second position allowing the high pressure air to flow out of the body, wherein the seal is in the first position when the high pressure air flows into the valve of the object to be inflated, and wherein the seal is in the second position when the high pressure air does not flow into the valve of the object to be inflated,
wherein the safety device includes an adjuster adjustably secured to the second section of the second channel and preventing the seal and the resilient member from moving out of the second section of the second channel, wherein the adjuster has a hole extending therethrough and the seal has a segment inserted and movably retained in the hole, wherein the seal moves in an axial direction when changing between the first and second positions, wherein a periphery of the hole and the segment of the seal have a gap existing therebetween, and wherein the gap and the hole are configured to allow the high pressure air to flow past the adjuster, and
wherein the first and second sections of the second channel have different cross sectional sizes and define a shoulder that transitions from the first section to the second section, wherein the second channel includes a first distal end of the first section connected to the first channel, wherein the second channel includes a first end distal end of the second section connected to a second distal end of the first section and a second distal end of the second section connected to the air discharge port respectively, wherein the safety device is disposed in the second section of the second channel, wherein the seal in the first position is rested on the shoulder and closes an opening defined by the second distal end of the first section of the second channel, and wherein the seal in the second position is spaced apart from the shoulder and opens the opening.

2. The high pressure cartridge inflator as claimed in claim 1, wherein the seal and the adjuster each form a retaining wall and the resilient member is retained between the retaining walls of the seal and the adjuster.

3. The high pressure cartridge inflator as claimed in claim 2, wherein the resilient member is a coil spring.

4. The high pressure cartridge inflator as claimed in claim 1, wherein the second section of the second channel has first threads formed thereon and the adjuster has second threads formed thereon in thread engagement with the first threads.

5. The high pressure cartridge inflator as claimed in claim 1, wherein the body includes a cover attached thereto and configured to selectively close and open an opening of the air discharge port.

6. The high pressure cartridge inflator as claimed in claim 2, wherein the body includes a cover attached thereto and configured to selectively close and open an opening of the air discharge port.

7. The high pressure cartridge inflator as claimed in claim 1, wherein the body has a connecting portion to which another high pressure cartridge is connected, wherein the connecting portion forms a cavity to which an end of the another high pressure cartridge is connected, and wherein the connecting portion is not fluidly connected to the first and second channels.

8. The high pressure cartridge inflator as claimed in claim 2, wherein the body has a connecting portion to which the another high pressure cartridge is connected, wherein the connecting portion forms a cavity to which an end of the another high pressure cartridge is connected, and wherein the connecting portion is not fluidly connected to the first and second channels.

9. The high pressure cartridge inflator as claimed in claim 7, wherein the body includes a cover attached thereto and configured to selectively close and open an opening of the air discharge port.

10. The high pressure cartridge inflator as claimed in claim 1, wherein the air inlet port, the first channel, and the second channel extend in different axial directions.

11. The high pressure cartridge inflator as claimed in claim 2, wherein the air inlet port, the first channel, and the second channel extend in different axial directions.

12. The high pressure cartridge inflator as claimed in claim 10, wherein the body includes a cover attached thereto and configured to selectively close and open an opening of the air discharge port.

13. The high pressure cartridge inflator as claimed in claim 12, wherein the body has a connecting portion to which another high pressure cartridge is connected, wherein the connecting portion forms a cavity to which an end of the another high pressure cartridge is connected, and wherein the connecting portion is not fluidly connected to the first and second channels.

* * * * *